(12) United States Patent
Yamaguchi et al.

(10) Patent No.: US 7,715,957 B2
(45) Date of Patent: May 11, 2010

(54) CONTROL DEVICE OF VEHICLE

(75) Inventors: Katsuhiko Yamaguchi, Nisshin (JP); Osamu Harada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1115 days.

(21) Appl. No.: 11/358,116

(22) Filed: Feb. 22, 2006

(65) Prior Publication Data

US 2007/0193792 A1 Aug. 23, 2007

(51) Int. Cl.
*B60K 6/00* (2007.10)

(52) U.S. Cl. ............... 701/22; 701/36; 701/113; 180/65.21

(58) Field of Classification Search ............ 701/22, 701/29–36, 101–105, 109, 113; 180/65.21–65.31
See application file for complete search history.

(56) References Cited

U.S. PATENT DOCUMENTS

| 5,555,737 | A | 9/1996 | Takeo et al. | |
|---|---|---|---|---|
| 7,213,665 | B2 * | 5/2007 | Yamaguchi et al. | 180/65.27 |
| 7,426,910 | B2 * | 9/2008 | Elwart | 123/46 E |
| 7,478,691 | B2 * | 1/2009 | Yamaguchi et al. | 180/65.28 |

FOREIGN PATENT DOCUMENTS

| JP | 06-165308 | 6/1994 |
|---|---|---|
| JP | 2004-165308 | 6/1994 |
| JP | 07-212902 | 8/1995 |
| JP | 08-065814 | 3/1996 |
| JP | 08-268036 A | 10/1996 |
| JP | 09-076740 A | 3/1997 |
| JP | 2000-078701 | 3/2000 |
| JP | 2001-063347 | 3/2001 |
| JP | 2002-247774 A | 8/2002 |
| JP | 2004-147379 | 5/2004 |
| JP | 2004-166367 | 6/2004 |

OTHER PUBLICATIONS

Japanese Language Version of Japanese Office Action, Appln. No. 242426/2004 mailed Nov. 6, 2007.
English Translation of Japanese Office Action, Appln. No. 242426/2004 mailed Nov. 6, 2007.
Japanese Language Version of Japanese Office Action, Appln. No. 2004-242426 dated Jul. 27, 2007.
English Translation of Japanese Office Action, Appln. No. 2004-242426 dated Jul. 27, 2007.

* cited by examiner

*Primary Examiner*—Richard M. Camby
(74) *Attorney, Agent, or Firm*—Kenyon & Kenyon LLP

(57) ABSTRACT

A hybrid ECU executes a program including the steps of: calculating an SOC of a battery when turn-on of pre-air-conditioning is requested; prohibiting pre-air-conditioning when the SOC does not satisfy a condition that the SOC is greater than an SOC (Y %) necessary for warm-up and running; and notifying a driver of prohibition of pre-air-conditioning.

12 Claims, 2 Drawing Sheets

CONTROL DEVICE OF VEHICLE

This nonprovisional application is based on Japanese Patent Application No. 2004-242426 filed with the Japan Patent Office on Aug. 23, 2004, the entire contents of which are hereby incorporated by reference.

FIELD OF THE INVENTION

The present invention relates to a control device of a vehicle, and more particularly to a control device of a vehicle that can run by using drive force generated by a motor.

DESCRIPTION OF THE BACKGROUND ART

What is called a hybrid vehicle that runs with drive force from at least one of an engine and a motor has conventionally been known. The hybrid vehicle selects the engine and/or the motor in accordance with a running state or the like of the vehicle, such that characteristics of each of the engine and motor are made use of In such a hybrid vehicle, there is a need for air-conditioning also while the engine is not operating.

Japanese Patent Laying-Open No. 09-076740 discloses a hybrid vehicle capable of cooling while the engine is not operating. The hybrid vehicle described in Japanese Patent Laying-Open No. 09-076740 includes a drive engine (engine) using fuel, a battery for running, a motor drive apparatus driving a motor with electric power charged in the battery, and a cooling apparatus driven by the electric power of the battery for running.

According to the hybrid vehicle described in this publication, the cooling apparatus is driven by the electric power of the battery for running. Therefore, cooling can be performed while the drive engine is not operating.

Meanwhile, as the engine is driven by burning the fuel, the hybrid vehicle still emits exhaust gas and requires a catalyst purifying the exhaust gas. In order for the catalyst to exhibit an effect to purify the exhaust gas, the catalyst should sufficiently be warm. For example, it has been known that warm-up for raising a temperature of the catalyst is necessary when the engine is started after a long non-operating state. During warm-up of the catalyst, the engine is controlled such that the exhaust gas in an amount that can be purified by the catalyst being warmed up is emitted. Here, the drive force generated in the engine is not used for running the vehicle, but the vehicle runs by using the drive force generated by the motor that receives power supply from the battery.

In the hybrid vehicle described in Japanese Patent Laying-Open No. 09-076740, however, electric power of the battery is consumed for driving the cooling apparatus while the engine is not operating. Accordingly, a state of charge of the battery may be lower than a state of charge necessary for running the vehicle with the motor. If the state of charge of the battery is lower than the state of charge necessary for running the vehicle with the motor, the engine should be driven by output necessary for running the vehicle even during warm-up of the catalyst. Therefore, the exhaust gas in an amount exceeding purifying capability of the catalyst being warmed up may be emitted.

SUMMARY OF THE INVENTION

An object of the present invention is to provide a control device of a vehicle preventing emission of a gas in an amount exceeding purifying capability of a catalyst that is being warmed up.

In addition, an object of the present invention is to provide a control device of a vehicle allowing a driver to know a state of the vehicle.

A control device of a vehicle according to the present invention is a control device of a vehicle incorporating a motor generating drive force, a power storage mechanism supplying electric power to the motor, and a catalyst purifying a gas exhausted along with generation of the drive force of the vehicle. The control device includes a determination unit determining whether or not warming-up of the catalyst is necessary, and a control unit controlling auxiliary machinery turned on by the electric power supplied from the power storage mechanism, based on a predetermined condition as to whether exhaust performance during running of the vehicle supplied with the electric power from the power storage mechanism can be ensured, when it is determined that warming-up of the catalyst is necessary.

According to the present invention, if it is determined that warming-up of the catalyst is necessary, the auxiliary machinery turned on by the electric power supplied from the power storage mechanism is controlled based on the predetermined condition as to whether or not exhaust performance during running of the vehicle supplied with the electric power from the power storage mechanism can be ensured. For example, if the condition that a state of charge of the power storage mechanism is greater than a predetermined state of charge is not satisfied, turn-on of an air-conditioning apparatus is prohibited. Accordingly, decrease in the state of charge of the power storage mechanism to a level lower than the state of charge necessary for running the vehicle with the motor during warm-up of the catalyst can be suppressed. Therefore, during warm-up of the catalyst, the vehicle can run by using the drive force generated by the motor. For example, in the case of a hybrid vehicle incorporating the engine, the motor and the power storage mechanism, consumption of engine output for running the vehicle can be suppressed during warm-up of the catalyst. Therefore, an amount of gas (exhaust gas) generated by driving the engine can be suppressed during warm-up of the catalyst. Alternatively, in the case of a fuel cell vehicle incorporating a fuel cell, a reformer and a catalyst purifying a gas (CO in particular) generated when hydrogen is extracted by means of the reformer, consumption of the electric power generated by the fuel cell for running the vehicle can be suppressed during warm-up of the catalyst. Therefore, an amount of electric power generated by the fuel cell and hence an amount of hydrogen extracted by means of the reformer can be suppressed. An amount of the gas (CO in particular) generated when hydrogen is extracted can thus be suppressed. Consequently, in any case, a control device of a vehicle preventing emission of the gas in an amount exceeding the purifying capability of the catalyst being warmed up can be provided.

Preferably, the predetermined condition is such a condition that a state of charge of the power storage mechanism is greater than a predetermined state of charge. When the condition is not satisfied, the control unit prohibits turn-on of the auxiliary machinery.

According to the present invention, if the condition that the state of charge of the power storage mechanism is greater than the predetermined state of charge is not satisfied, turn-on of the air-conditioning apparatus is prohibited. Accordingly, decrease in the state of charge of the power storage mechanism to a level lower than the state of charge necessary for running the vehicle with the motor that receives power supply from the power storage mechanism during warm-up of the catalyst can be suppressed. Therefore, during warm-up of the catalyst, the vehicle can run by using the drive force generated by the motor. For example, in the case of a hybrid vehicle incorporating the engine, the motor and the power storage mechanism, consumption of the engine output for running the vehicle can be suppressed during warm-up of the catalyst. Therefore, an amount of gas (exhaust gas) generated by driving the engine can be suppressed during warm-up of the catalyst. Alternatively, in the case of a fuel cell vehicle incorporating a fuel cell, a reformer and a catalyst purifying a gas (CO in particular) generated when hydrogen is extracted by means of the reformer, consumption of the electric power generated by the fuel cell for running the vehicle can be suppressed during warm-up of the catalyst. Therefore, an amount of electric power generated by the fuel cell and hence an amount of hydrogen extracted by means of the reformer can be suppressed. An amount of the gas (CO in particular) generated when hydrogen is extracted can thus be suppressed.

Preferably, the control device of a vehicle further includes a notification unit notifying a driver of prohibition of turn-on of the auxiliary machinery when turn-on of the auxiliary machinery is prohibited.

According to the present invention, when turn-on of the auxiliary machinery is prohibited, the driver is notified of that fact. Accordingly, a control device of a vehicle allowing a driver to know a state of the vehicle can be provided.

Preferably, the vehicle incorporates an engine generating the drive force. The catalyst purifies the gas exhausted from the engine.

According to the present invention, in a vehicle utilizing the engine as a source of the drive force, emission of the gas in an amount exceeding the purifying capability of the catalyst being warmed up can be prevented.

Preferably, the auxiliary machinery is an air-conditioning apparatus.

According to the present invention, in a vehicle provided with the air-conditioning apparatus, emission of the gas in an amount exceeding the purifying capability of the catalyst being warmed up can be prevented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
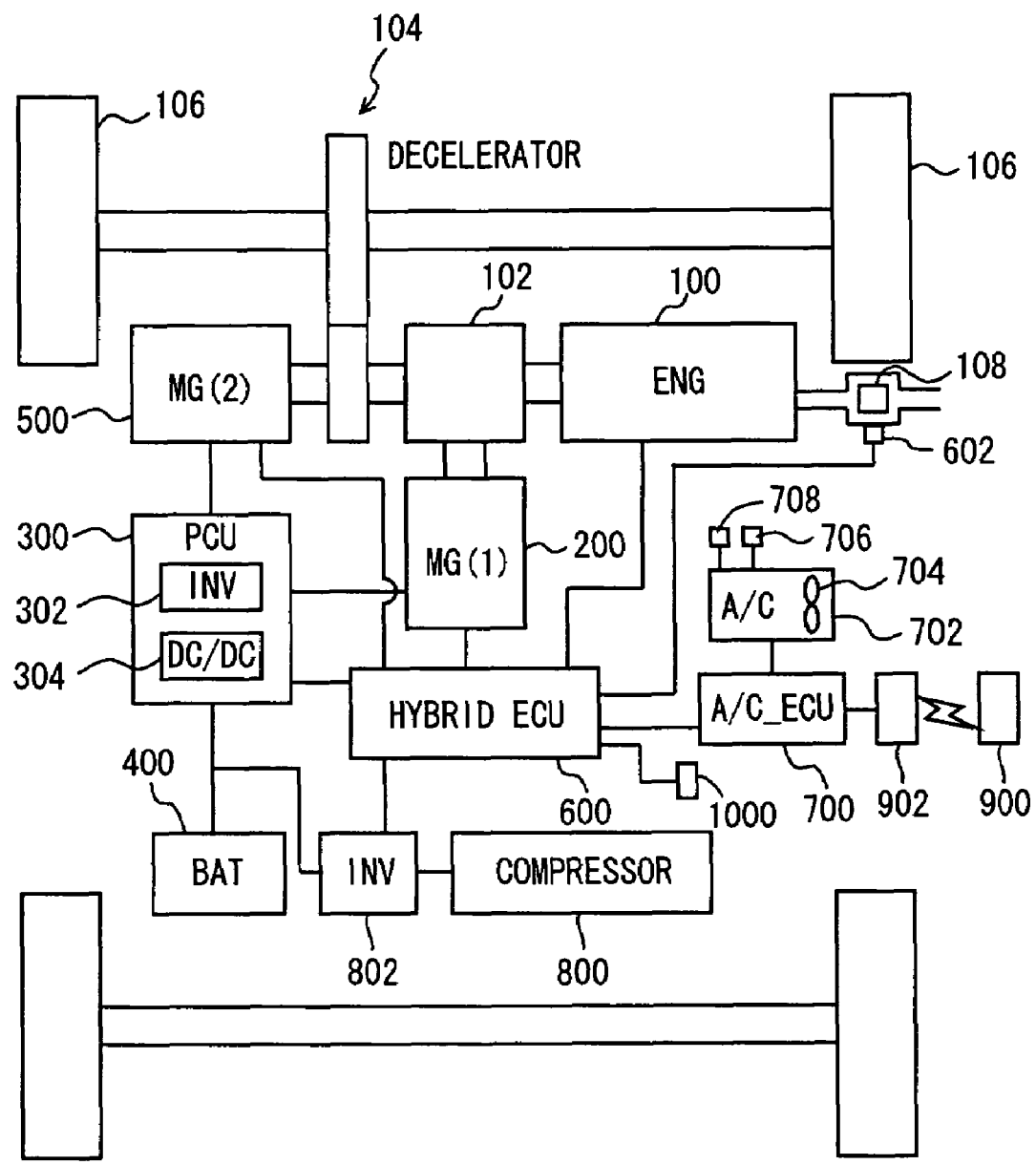
FIG. 1 is a control block diagram showing a configuration of a hybrid vehicle incorporating a control device according to the present embodiment.

An embodiment of the present invention will be described hereinafter with reference to the drawings. The same elements have the same reference characters allotted. Their label and function are also identical. Therefore, detailed description thereof will not be repeated.

A vehicle incorporating a control device according to an embodiment of the present invention will be described with reference to FIG. 1. The vehicle includes an engine 100, an MG (Motor Generator) (1)200, a PCU (Power Control Unit) 300, a battery 400, an MG (2)500, a hybrid ECU (Electronic Control Unit) 600, an A/C (Air Conditioner)_ECU 700, and an A/C unit 702. The control device according to the embodiment of the present invention is implemented, for example, by a program executed by hybrid ECU 600.

In the present embodiment, the vehicle will be described as a hybrid vehicle incorporating engine 100, however, a fuel cell vehicle incorporating a fuel cell, an electric vehicle or the like may be employed instead of the hybrid vehicle.

Engine 100 rotates a crankshaft (not shown) by burning an air-fuel mixture and generates the drive force. The drive force generated by engine 100 is split into two paths by a power split device 102. Specifically, the drive force in one path drives wheels 106 through a decelerator 104, while the drive force in the other path drives MG (1)200 for power generation.

In addition, an exhaust pipe exhausting the exhaust gas generated as a result of burning of the fuel is connected to engine 100. In the exhaust pipe, a catalyst 108 purifying the exhaust gas is provided. Catalyst 108 is implemented by what is called a three-way catalyst, which oxidizes hydrocarbon and carbon monoxide to carbon dioxide and water as well as reduces nitrogen oxides. In order for catalyst 108 to exhibit its purifying effect, it should sufficiently be warm. When engine 100 is started after a long non-operating state, the temperature of catalyst 108 is low and warming-up for raising the temperature thereof is necessary. In the present embodiment, whether warming-up of catalyst 108 is necessary or not is determined based on a catalyst temperature TC.

To that end, a catalyst temperature sensor 602 is provided on the exhaust pipe around catalyst 108. Catalyst temperature sensor 602 is connected to hybrid ECU 600, and transmits a signal indicating catalyst temperature TC to hybrid ECU 600. If catalyst temperature TC is lower than a predetermined temperature, it is determined that warming-up of catalyst 108 is necessary.

Whether warming-up of catalyst 108 is necessary or not may be determined, for example, based on an elapsed time since manipulation of an ignition switch for starting, an engine coolant temperature, or an elapsed time since start of a system.

Though the hybrid vehicle according to the present embodiment includes engine 100 and catalyst 108, instead, the vehicle may be configured, for example, to include a fuel cell, a reformer and a catalyst purifying a gas (CO in particular) generated when hydrogen is extracted by means of the reformer.

MG (1)200 is driven by the power of engine 100 split by power split device 102, so as to generate electric power. The electric power generated by MG (1)200 is selected for use depending on an operation state of the vehicle and a state of charge (SOC) of battery 400. For example, during normal running or at the time of sudden acceleration, the electric power generated by MG (1)200 is supplied to MG (2)500 through PCU 300.

On the other hand, if the SOC of battery 400 is lower than the predetermined value, the electric power generated by MG (1)200 is converted from AC power to DC power by an inverter 302 of PCU 300. After a converter 304 regulates a voltage of the DC power, the electric power is stored in battery 400.

Battery 400 is a battery pack obtained by integrating a plurality of battery cells to implement a battery module and by connecting a plurality of battery modules in series. A capacitor may be employed instead of battery 400.

MG (2)500 is a three-phase AC rotating electric machine. MG (2)500 is driven by at least one of electric power stored in battery 400 and electric power generated by MG (1)200. The drive force of MG (2)500 is transmitted to wheels 106 through decelerator 104, so that MG (2)500 assists engine 100 and runs the vehicle, or solely the drive force thereof runs the vehicle.

During regenerative braking of the vehicle, MG (2)500 is driven by wheels 106 through decelerator 104, and MG (2)500 is caused to operate as the generator. MG (2)500 thus operates as a regenerative brake that converts braking energy to electric power. The electric power generated by MG (2)500 is stored in battery 400 through inverter 302 and converter 304.

Hybrid ECU 600 performs operational processing based on catalyst temperature TC, an operation state of the vehicle, an accelerator position, a rate of change in the accelerator position, a shift position, the SOC and the temperature of battery 400, a map and a program stored in a memory, and the like. Accordingly, hybrid ECU 600 controls machinery mounted on the vehicle, such that the vehicle enters a desired operation state.

When it is determined that catalyst temperature TC is lower than the predetermined temperature and that warming-up of catalyst 108 is necessary, hybrid ECU 600 realizes warm-up and running, in which engine 100 is started, catalyst 108 is warmed by the exhaust gas emitted by engine 100, and the vehicle runs by using the drive force from MG (2)500 receiving power supply from battery 400.

If the SOC of battery 400 is reduced to X % (for example, 40%) during running of the hybrid vehicle, such a state is determined as a state where battery 400 can no longer supply electric power to MG (2)500. Here, the hybrid vehicle runs only with the drive force of engine 100, without power supply from battery 400 to MG (2)500. Here, engine 100 drives MG (1)200, and the electric power generated by MG (1)200 is stored in battery 400.

Hybrid ECU 600 and A/C_ECU 700 are connected to each other such that a signal can be communicated therebetween. In addition, A/C unit 702 is connected to A/C_ECU 700. A/C_ECU 700 controls A/C unit 702 based on a temperature in a vehicle room detected by a vehicle room temperature sensor 706 and a manipulation state of a switch manipulated by the driver. Air at a blowing temperature set by A/C_ECU 700 is blown out of A/C unit 702. A/C_ECU 700 determines, in a stepped manner, the voltage with which an A/C fan 704 is driven, based on the temperature in the vehicle room.

In addition, A/C_ECU 700 calculates the number of revolutions of a compressor 800 driven when A/C unit 702 operates for cooling. As a known technique is used as a method of calculating the number of revolutions of compressor 800, detailed description thereof will not be repeated.

The calculated number of revolutions of compressor 800 is transmitted from A/C_ECU 700 to hybrid ECU 600. Hybrid ECU 600 controls an A/C inverter 802 connected to battery 400 such that the number of revolutions of compressor 800 attains to the calculated number of revolutions. Compressor 800 is driven by power supply from battery 400 through A/C inverter 802. As a result of drive of compressor 800 and compression of a coolant, A/C unit 702 performs the cooling operation. It is noted that A/C unit 702 may be configured to perform a heating operation using electric power supplied from battery 400.

A/C unit 702 can be operated not only when the driver manipulates switch 708 in the vehicle room but also when the driver manipulates a transmitter 900 from outside of the vehicle. In order to receive a signal transmitted from transmitter 900, a receiver 902 is connected to A/C_ECU 700. By using transmitter 900 and receiver 902, pre-air-conditioning for cooling or heating is performed before the driver enters the vehicle.

Pre-air-conditioning is prohibited if a predetermined condition is not satisfied. If pre-air-conditioning is prohibited, an indicator light 1000 in a combination meter (not shown) is used to notify the driver of prohibition of pre-air-conditioning. Accordingly, the driver can know that pre-air-conditioning has been prohibited in entering the vehicle.

It is noted that a method of notifying the driver of prohibition of pre-air-conditioning is not limited as such, and prohibition of pre-air-conditioning may be shown on a display on a dash panel or on a display of a car navigation device. Alternatively, notification of prohibition of pre-air-conditioning may be given by using sound. Further alternatively, an indicator light provided in a switch of A/C unit 702 or transmitter 900 may illuminate or flash.

Figure 2:
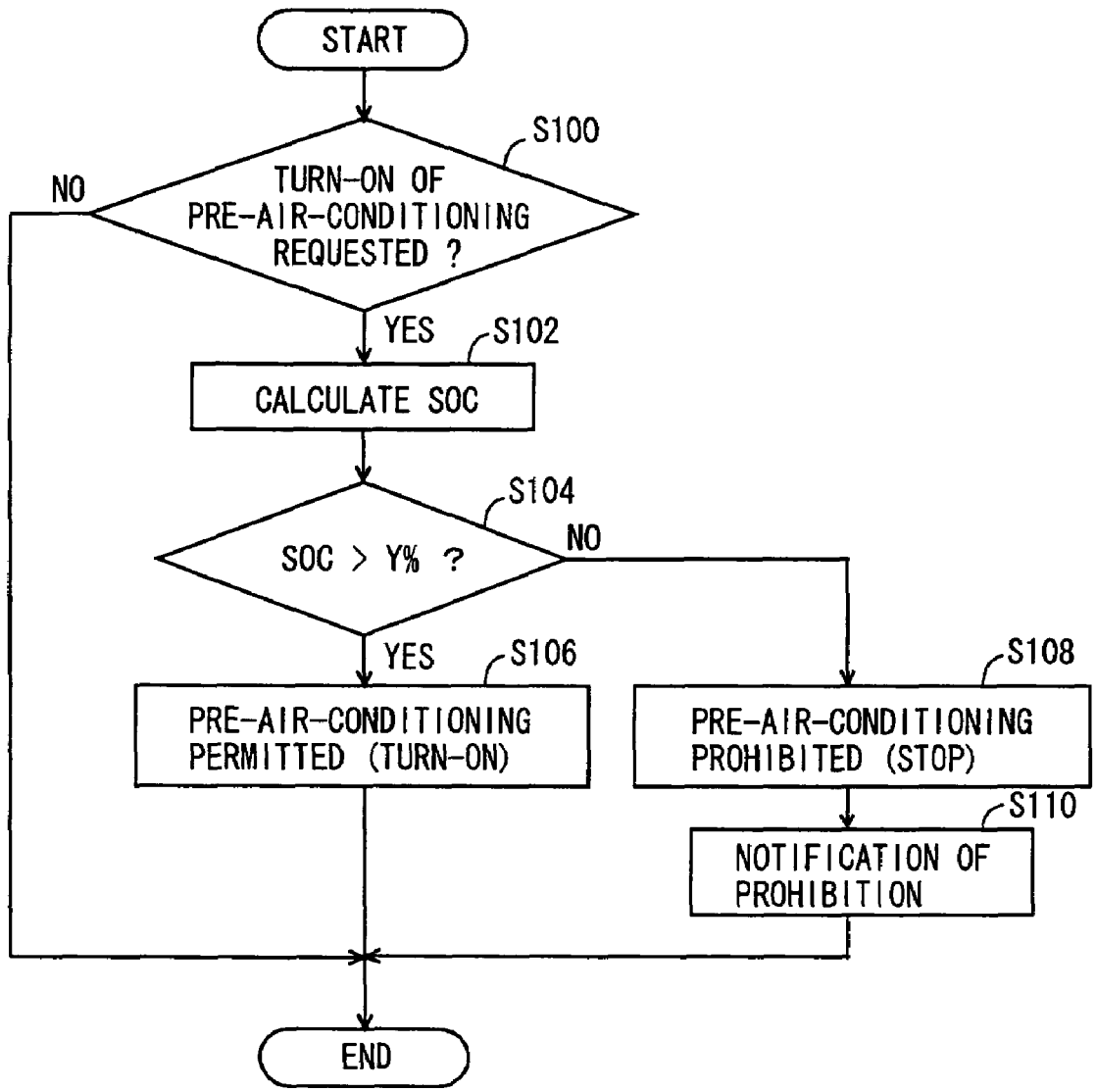
FIG. 2 is a flowchart showing a control configuration of a program executed by a hybrid ECU serving as the control device according to the present embodiment.

A control configuration of a program executed by hybrid ECU 600 serving as the control device of the vehicle according to the present embodiment will be described with reference to FIG. 2.

At step (hereinafter, step is abbreviated as S) 100, hybrid ECU 600 determines whether turn-on of pre-air-conditioning has been requested or not, based on a signal transmitted from A/C_ECU 700. If turn-on of pre-air-conditioning has been requested (YES at S100), the process proceeds to S102. Otherwise (NO at S100), the process ends.

At step S102, hybrid ECU 600 calculates the SOC of battery 400. The SOC is calculated based on an integral of a charge/discharge current value of battery 400. As a known technique is used as a method of calculating the SOC, detailed description thereof will not be repeated.

At step S104, hybrid ECU 600 determines whether the SOC of battery 400 is greater than Y % (for example, 50%) or not. Here, Y % is set to such a value that the SOC of battery 400 is not lower than X % at the end of warming-up even if the SOC of battery 400 is decreased during warm-up and running. Specifically, Y % is a value obtained by finding an amount of SOC of battery 400 decreased by the end of warming-up through experiments on a hybrid vehicle using various combined running patterns such as the non-operating state for a long time, gentle acceleration, sudden acceleration, and the like and by adding the obtained amount of decrease to a lower limit (X %) of the electric power that battery 400 can supply. If the SOC of battery 400 is greater than Y % (YES at S104), the process proceeds to S106. Otherwise (NO at S104), the process proceeds to S108.

At step S106, hybrid ECU 600 permits pre-air-conditioning. Here, hybrid ECU 600 transmits a signal indicating permission of pre-air-conditioning to A/C_ECU 700. Accordingly, A/C_ECU 700 controls A/C unit 702 so as to turn on pre-air-conditioning.

At step S108, hybrid ECU 600 prohibits pre-air-conditioning. Here, hybrid ECU 600 transmits a signal indicating prohibition of pre-air-conditioning to A/C_ECU 700. Accordingly, A/C_ECU 700 controls A/C unit 702 so as not to turn on pre-air-conditioning or so as to stop pre-air-conditioning.

At step S110, hybrid ECU 600 causes indicator light 1000 in the combination meter (not shown) to illuminate, so as to notify the driver of prohibition of turn-on of pre-air-conditioning.

An operation of hybrid ECU 600 serving as the control device according to the present embodiment based on the configuration and the flowchart as above will now be described.

When transmitter 900 is manipulated and turn-on of pre-air-conditioning is requested while a vehicle system is not operating (YES at S100), the SOC of battery 400 is calculated (S102) and whether the SOC is greater than Y % or not is determined (S104).

If the SOC of battery 400 is greater than Y % (YES at S104), pre-air-conditioning is permitted (S106) and a signal indicating permission is transmitted to A/C_ECU 700. A/C unit 702 is thus controlled to turn on pre-air-conditioning.

On the other hand, if the SOC is lower than Y % (NO at S104) at the time when turn-on of pre-air-conditioning is requested (YES at S100) or if the SOC is reduced to a level lower than Y % due to pre-air-conditioning (NO at S104), pre-air-conditioning is prohibited (S108). Accordingly, decrease in the SOC is suppressed and electric power necessary for warm-up and running can be secured. As to the SOC (Y %) representing a threshold value below which pre-air-conditioning is prohibited, there may be hysteresis between start of pre-air-conditioning and stop of pre-air-conditioning that is being performed.

When turn-on of pre-air-conditioning is prohibited (S108), indicator light 1000 illuminates and the driver is notified of prohibition of turn-on of pre-air-conditioning (S110). Accordingly, when the driver enters the vehicle, he/she can know that electric power of battery 400 is short and pre-air-conditioning has been prohibited.

As described above, the hybrid ECU serving as the control device according to the present embodiment prohibits turn-on of pre-air-conditioning when the SOC of the battery does not satisfy the condition that it is greater than the SOC necessary for warm-up and running. In this manner, decrease in the SOC is suppressed and electric power necessary for warm-up and running can be secured. Therefore, it is not necessary to spend the drive force generated in the engine for running during warm-up of the catalyst, and the engine output can be suppressed to a level necessary for warming up the catalyst. Consequently, emission of the gas in an amount exceeding the purifying capability of the catalyst can be suppressed.

It is noted that the catalyst requiring warm-up includes a catalyst purifying a gas emitted from a reformer that reforms hydrocarbon-based fuel into a hydrogen gas and supplying the hydrogen gas to the engine or the fuel cell.

In addition, though whether turn-on of pre-air-conditioning is permitted or not has been determined based on the SOC of the battery in the embodiment described above, whether turn-on of auxiliary machinery such as an antitheft alarm device in addition to pre-air-conditioning is permitted or not may be determined based on the SOC.

Moreover, though whether turn-on of pre-air-conditioning is permitted or not has been determined by the hybrid ECU in the embodiment described above, it may be determined by the A/C_ECU instead.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device of a vehicle incorporating a motor generating drive force, a power storage mechanism supplying electric power to said motor, an air-conditioner configured to operate by the electric power supplied from said power storage mechanism before the driver enters the vehicle, and a catalyst purifying a gas exhausted along with generation of the drive force of the vehicle, comprising:
    a determination unit determining whether warming-up of said catalyst is necessary; and
    a control unit controlling the operation of said air-conditioner by the electric power supplied from said power storage mechanism before the driver enters the vehicle, based on a predetermined condition as to whether exhaust performance during running of the vehicle supplied with the electric power from said power storage mechanism can be ensured, when it is determined that warming-up of said catalyst is necessary.

2. The control device of a vehicle according to claim 1, wherein
    said predetermined condition is such a condition that a state of charge of said power storage mechanism is greater than a predetermined state of charge, and
    when said condition is not satisfied, said control unit prohibits the operation of said air-conditioner by the electric power supplied from said power storage mechanism before the driver enters the vehicle.

3. The control device of a vehicle according to claim 2, further comprising a notification unit notifying a driver of prohibition of the operation of said air-conditioner when the operation of said air-conditioner by the electric power supplied from said power storage mechanism before the driver enters the vehicle is prohibited.

4. The control device of a vehicle according to claim 1, wherein
    said vehicle incorporates an engine generating the drive force, and
    said catalyst purifies the gas exhausted from said engine.

5. A control device of a vehicle incorporating a motor generating drive force, a power storage mechanism supplying electric power to said motor, an air-conditioner configured to operate by the electric power supplied from said power storage mechanism before the driver enters the vehicle, and a catalyst purifying a gas exhausted along with generation of the drive force of the vehicle, comprising:
    means for determining whether warming-up of said catalyst is necessary; and
    means for controlling the operation of said air-conditioner by the electric power supplied from said power storage mechanism before the driver enters the vehicle, based on a predetermined condition as to whether exhaust performance during running of the vehicle supplied with the electric power from said power storage mechanism can be ensured, when it is determined that warming-up of said catalyst is necessary.

6. The control device of a vehicle according to claim 5, wherein
    said predetermined condition is such a condition that a state of charge of said power storage mechanism is greater than a predetermined state of charge, and
    said control means includes means for prohibiting the operation of said air-conditioner by the electric power supplied from said power storage mechanism before the driver enters the vehicle when said condition is not satisfied.

7. The control device of a vehicle according to claim 6, further comprising means for notifying a driver of prohibition of the operation of said air-conditioner when the operation of said air-conditioner by the electric power supplied from said power storage mechanism before the driver enters the vehicle is prohibited.

8. The control device of a vehicle according to claim 5, wherein
    said vehicle incorporates an engine generating the drive force, and
    said catalyst purifies the gas exhausted from said engine.

9. The control device of a vehicle according to claim 2, wherein
    said vehicle incorporates an engine generating the drive force, and
    said catalyst purifies the gas exhausted from said engine.

10. The control device of a vehicle according to claim 3, wherein
said vehicle incorporates an engine generating the drive force, and
said catalyst purifies the gas exhausted from said engine.

11. The control device of a vehicle according to claim 6, wherein
said vehicle incorporates an engine generating the drive force, and
said catalyst purifies the gas exhausted from said engine.

12. The control device of a vehicle according to claim 7, wherein
said vehicle incorporates an engine generating the drive force, and
said catalyst purifies the gas exhausted from said engine.

* * * * *